(12) United States Patent
Ruan et al.

(10) Patent No.: US 11,658,448 B2
(45) Date of Patent: May 23, 2023

(54) UNIDIRECTIONAL FREE-PULLING DATA CABLE

(71) Applicant: Dongguan Ceesing Intelligent Device Manufacturing Co., Ltd, Dongguan (CN)

(72) Inventors: Min Ruan, Dongguan (CN); Shengwei Zhang, Dongguan (CN); Zhanxing Lin, Dongguan (CN)

(73) Assignee: Dongguan Ceesing Intelligent Device Manufacturing Co., Ltd, Dongguan (CN)

( * ) Notice: Subject to any disclaimer, the term of this patent is extended or adjusted under 35 U.S.C. 154(b) by 0 days.

(21) Appl. No.: 17/870,858

(22) Filed: Jul. 22, 2022

(65) Prior Publication Data
US 2023/0024575 A1    Jan. 26, 2023

(30) Foreign Application Priority Data
Jul. 23, 2021 (CN) .......................... 202121700984.6

(51) Int. Cl.
*H01R 39/00* (2006.01)
*H01R 35/04* (2006.01)

(52) U.S. Cl.
CPC .................. *H01R 35/04* (2013.01)

(58) Field of Classification Search
CPC ...................................... H01R 35/04
USPC ........................................... 439/11
See application file for complete search history.

(56) References Cited

U.S. PATENT DOCUMENTS

| 4,904,190 | A | * | 2/1990 | Plocek | H01R 35/04 439/15 |
| 5,229,544 | A | * | 7/1993 | Horiuchi | H01R 35/025 174/562 |
| 5,256,075 | A | * | 10/1993 | Miyahara | H02G 11/00 439/15 |
| 5,286,219 | A | * | 2/1994 | Ueno | H02G 11/00 439/15 |
| RE34,693 | E | * | 8/1994 | Plocek | B60R 16/027 439/15 |
| 5,484,294 | A | * | 1/1996 | Sobhani | H01R 39/10 439/21 |
| 5,547,144 | A | * | 8/1996 | Sakamoto | H01R 35/025 242/402 |

(Continued)

*Primary Examiner* — Abdullah A Riyami
*Assistant Examiner* — Vladimir Imas
(74) *Attorney, Agent, or Firm* — Andrew C. Cheng (57) ABSTRACT

The present disclosure relates to the technical field of data cables, more particularly to a unidirectional free-pulling data cable that includes a first wire, a second wire and a hollow housing in which a wheel core, a follow-up circuit board, a clamping assembly, and a fixed conductive board disposed on one side of the housing corresponding to and electrically connected to the follow-up circuit board are arranged. The wheel core, with an elastic member disposed therein and a wheel cover disposed at the opposite side thereof, rotates relative to the housing. The first and second wires are exposed out of the housing partially. The clamping assembly cooperates with the wheel cover to position the wheel core to limit the rotation thereof, which solves the problem that the input and output ends of the existing telescopic data cable need to be stretched simultaneously when using, and is more convenient to use.

18 Claims, 7 Drawing Sheets

(56) References Cited

U.S. PATENT DOCUMENTS

| | | | | |
|---|---|---|---|---|
| 5,551,882 A * | 9/1996 | Whiteman, Jr. | H01R 35/04 | 439/31 |
| 5,690,498 A * | 11/1997 | Sobhani | H01R 39/10 | 439/22 |
| 5,704,792 A * | 1/1998 | Sobhani | H01R 39/64 | 439/21 |
| 6,548,755 B2 | 4/2003 | Wu | H01R 35/04 | 439/23 |
| 6,595,452 B1 * | 7/2003 | Berthaud | H02G 11/02 | 242/388.1 |
| 6,659,782 B2 * | 12/2003 | Wu | H01R 31/065 | 439/131 |
| 6,897,379 B1 * | 5/2005 | Hsiao | H01R 35/04 | 174/53 |
| 7,057,108 B1 * | 6/2006 | Sodemann | H01R 13/7135 | 439/639 |
| 7,594,819 B2 * | 9/2009 | Araki | H01R 35/025 | 439/164 |
| 7,749,008 B2 * | 7/2010 | Klassen | H01R 13/6658 | 439/372 |
| 7,758,358 B1 * | 7/2010 | Mier-Langner | H01R 25/142 | 362/648 |
| 7,802,995 B2 * | 9/2010 | Lai | H01R 35/02 | 439/21 |
| 7,955,124 B2 * | 6/2011 | Su | H01R 31/06 | 439/620.22 |
| 8,801,465 B2 * | 8/2014 | Yeh | H01R 24/66 | 439/76.1 |
| 8,821,167 B2 * | 9/2014 | Ritner | H01R 13/5219 | 439/67 |
| 8,916,774 B2 * | 12/2014 | Richards | H02G 3/0487 | 439/639 |
| 9,455,528 B1 * | 9/2016 | Chao | H01R 13/64 | |
| 9,789,321 B2 * | 10/2017 | Dixit | A61N 1/3752 | |
| 10,651,617 B1 * | 5/2020 | Saito | H05K 1/147 | |
| 11,325,546 B2 * | 5/2022 | Hirohashi | H01R 35/025 | |
| 11,394,162 B2 * | 7/2022 | Shiotani | H02G 11/02 | |
| 2010/0151723 A1 * | 6/2010 | Su | H01R 31/06 | 439/505 |
| 2011/0086519 A1 * | 4/2011 | Chung | H04B 1/034 | 439/31 |
| 2018/0325396 A1 * | 11/2018 | Axelrod | H01R 13/6205 | |
| 2020/0235632 A1 * | 7/2020 | Oiwa | H01R 35/04 | |
| 2021/0210915 A1 * | 7/2021 | Galazin | H01R 13/6691 | |
| 2021/0238007 A1 * | 8/2021 | Wilson | B65H 75/4484 | |

* cited by examiner

UNIDIRECTIONAL FREE-PULLING DATA CABLE

TECHNICAL FIELD

The present disclosure relates to the technical field of data cables, and more particularly to a unidirectional free-pulling data cable.

BACKGROUND

With the continuous improvement of living standards, people often carry electronic products, such as mobile phones, computers, etc., and corresponding data cables to charge electronic products when they go out. At present, traditional data cables are generally long linear data cables, which are easily entangled or even knotted. Therefore, telescopic data cables appear on the market.

However, when the existing telescopic data cable is stretched, the input end and the output end need to be stretched at the same time to be used, instead of being stretched separately, which is inconvenient to use.

SUMMARY

To solve the problem that the existing telescopic data cable is inconvenient to use, the present disclosure provides a unidirectional free-pulling data cable.

To solve the above technical problems, the present disclosure provides a unidirectional free-pulling data cable which includes a first wire, a second wire, a wheel core, a follow-up circuit board, a fixed conductive board, a clamping assembly and a hollow housing. The wheel core and the clamping assembly are arranged in the housing, and the wheel core is rotatable relative to the housing. The follow-up circuit board is positioned on one side of the wheel core, and the fixed conductive board is disposed on one side of the housing corresponding to the follow-up circuit board and electrically connected to the follow-up circuit board. The first wire, which is electrically connected to the follow-up circuit board, is wound around the wheel core and exposed out of the housing. One end of the second wire is electrically connected to the fixed conductive board, and the other end thereof is exposed out of the housing. An elastic member is disposed inside the wheel core, and the opposite side of the wheel core is provided with a wheel cover. The clamping assembly, which is disposed on one side of the housing corresponding to the wheel cover, cooperates with the wheel cover to position the wheel core to limit the rotation of the wheel core.

Preferably, a first through-hole and a second through-hole are defined on the housing, which respectively allow the first wire and the second wire to be exposed out of the housing.

Preferably, a fixing member is provided at the second through-hole, and the second wire is exposed out of the housing through the fixing member to prevent the second wire from moving away from the housing.

Preferably, the edge of the first through-hole along the thickness direction of the housing is a smooth-curved surface.

Preferably, a blocking member, which is used for limiting the distance that the first wire is pulled out in a direction away from the housing, is provided at the position close to the end of the first wire connected to the wheel core.

Preferably, the position of the blocking member on the first wire matches the position of the first wire corresponding to the first through-hole when the elastic member is smaller than or equal to the elastic limit.

Preferably, the blocking member includes at least one blocking piece. One end of the blocking piece is fixed on the first wire, the other end thereof is a free end and is disposed obliquely to the first wire. When the first wire is pulled out from the housing, the blocking piece moves following the first wire to the first through-hole and the free end of the blocking piece abuts against the inner wall of the housing, so that the stretching distance of the first wire in the direction away from the housing can be limited.

Preferably, the blocking member includes two blocking pieces arranged in a splayed shape, and the distance between the free ends of the two blocking pieces in a natural state is larger than the aperture of the first through-hole.

Preferably, four circular conductive rails, which are concentric circles with different diameters, are arranged at positions of the fixed conductive board corresponding to the follow-up circuit board. At least two electrical conductive elements are arranged on the follow-up circuit board, and each of the electrical conductive elements is provided with four metal contacts that are electrically connected to the corresponding circular conductive rails.

Preferably, the clamping assembly includes an elastic element, a connecting element and a gear. A wheel slot is defined on the wheel cover. One end of the connecting element is provided with a protrusion matching the wheel slot, and the other end thereof abuts against the elastic element. One side of the connecting element close to the gear is further provided with a first protrusion and a second protrusion, and the gear is disposed between the first protrusion and the second protrusion.

Preferably, the adjacent two slots of the gear, which are respectively defined as a first slot and a second slot, have different depths. The first slot and the second slot are respectively engaged with the first protrusion and the second protrusion.

Preferably, the housing includes an upper housing and a lower housing, which are detachably connected. The wheel core is disposed in the lower housing, and the clamping assembly is disposed in the upper housing.

Preferably, a fixing pillar is disposed in the lower housing, one end of the elastic member is positioned on the fixing pillar, and the other end thereof is positioned on the wheel core. When the wheel core rotates, the elastic member provides the wheel core with a restoring force for rotating back.

Preferably, the detachable connection may be clamping, bonding, or magnetic connection.

Preferably, one of the first wire and the second wire is the input end, and the other one is the output end.

Preferably, both ends of the first wire and the second wire exposed out of the housing are provided with ports, one end thereof is provided with an input port for connecting to a plug or a charging port to connect power or transmit data, and the other end thereof is provided with an output port for charging an external device or transmitting data.

Preferably, the input port may be one of a USB interface and a Type-C interface; the output port may be one or more combinations of a micro USB interface, a Type-C interface and a Lightning interface.

Preferably, the fixing member generally has a structure of wide in two ends and narrow in the middle. The narrow middle portion is clamped at the second through-hole, and the wide ends portion enable the fixing member to be firmly fixed at the second through-hole.

Preferably, the elastic element is a spring piece with two ends fixed on the housing. The middle portion thereof has an elastic function, and one end of the connecting element away from the protrusion abuts against the middle portion thereof through a protruding pillar.

Preferably, the metal contact may be a metal contact pin or a metal elastic piece.

Compared with the prior art, the unidirectional free-pulling data cable of the present disclosure has the following beneficial effects.

In the unidirectional free-pulling data cable of the embodiment of the present disclosure, the first wire, which is electrically connected with the follow-up circuit board positioned at one side of the wheel core, is wound around the wheel core and exposed out of the housing, and the second wire is electrically connected with the fixed conductive board. In this case, the input end and the output end of the unidirectional free-pulling data cable are independent of each other, namely, a user only needs to stretch the wire at the input end or the output end when using, which solves the problem that the input end and the output end of the existing telescopic data cable are required to be stretched simultaneously when using, and is more convenient for use. In addition, the fixed conductive board in the housing is electrically connected to the follow-up circuit board that rotates with the wheel core, which ensures an electric connection between the input end and the output end while only stretching the input end or the output end. Moreover, the wheel cover is disposed on one side of the wheel core, and the clamping assembly is arranged on the inner wall of the housing corresponding to the wheel cover and cooperates with the wheel cover, which can position the wheel core and limit the rotation of the wheel core when stretching, and can retract the wire due to the action of the elastic member inside the wheel core when retracting, thereby improving the user experience.

In the unidirectional free-pulling data cable of the embodiment of the present disclosure, a first through-hole and a second through-hole are defined on the housing, which respectively make the first wire and the second wire be exposed out of the housing to facilitate the stretching of the corresponding wires.

In the unidirectional free-pulling data cable of the embodiment of the present disclosure, a fixing member is provided at the second through-hole, and the second wire is exposed out of the housing through the fixing member to prevent the second wire from moving away from the housing. By disposing the fixing member, the second wire can be prevented from stretching in the direction away from the housing, namely, the end of the second wire that is electrically connected to the fixed conductive board is relatively fixed to the fixed conductive board to prevent poor contact between the second wire and the fixed conductive board due to dragging the second wire, which ensures the normal use of the unidirectional free-pulling data cable.

In the unidirectional free-pulling data cable of the embodiment of the present disclosure, the edge of the first through-hole along the thickness direction of the housing is a smooth-curved surface. Thus, the first wire, when in contact with the edge of the first through-hole, can be prevented from being scratched by the edge of the first through-hole. The scratch can be prevented to the greatest extent especially when stretching one end of the first wire due to the force acting on the first wire and the edge of the first through-hole being large. In addition, the smooth-curved surface can play a guiding role, which enables another end of the first wire to be more smoothly away from the housing when a user stretches one end of the first wire.

In the unidirectional free-pulling data cable of the embodiment of the present disclosure, a blocking member, which is used for limiting the distance that the first wire is pulled out in a direction away from the housing, is provided at the position close to the end of the first wire connected to the wheel core. By disposing the blocking member, the distance that the first wire is extended out of the housing can be limited, which prevents the elastic member in the wheel core from being damaged due to overstretching and ensures the normal use of the unidirectional free-pulling data cable. In addition, the position of the blocking member disposed on the first wire matches the position of the first wire corresponding to the first through-hole when the elastic member is at the elastic limit, so that the elastic member 131 can be maintained within the elastic limit range, which prevents the situation that the elastic member exceeds the elastic limit and cannot return to the original state when stretching the first wire, causing that the first wire cannot be retracted, and the lifetime of the elastic member is further prolonged.

In the unidirectional free-pulling data cable of the embodiment of the present disclosure, the blocking member includes at least one blocking piece. One end of the blocking piece is fixed on the first wire, the other end thereof is a free end and is disposed obliquely to the first wire. When the first wire is pulled out from the housing, the blocking piece moves following the first wire to the first through-hole and the free end of the blocking piece abuts against the inner wall of the housing so that the stretching distance of the first wire in the direction away from the housing can be limited. Thus, the free end is in close contact with the first wire when retracting, and in a naturally open state when stretching, which does not affect the first wire being wound on the wheel core when retracting, and the first wire can also be limited when stretching to a certain extent in the direction away from the housing, which has great practicability.

In the unidirectional free-pulling data cable of the embodiment of the present disclosure, the blocking member includes two blocking pieces arranged in a splayed shape, and the distance between the free ends of the two blocking pieces in a natural state is larger than the aperture of the first through-hole. Thus, the free ends of the two blocking pieces are respectively opened to both sides of the first wire while stretching, so that the stretching of the first wire in the direction away from the housing can be further limited. The free ends thereof are in close contact with the first wire while retracting to ensure the normal retraction of the first wire.

In the unidirectional free-pulling data cable of the embodiment of the present disclosure, four circular conductive rails, which are concentric circles with different diameters, are arranged at positions of the fixed conductive board corresponding to the follow-up circuit board. At least two electrical conductive elements are arranged on the follow-up circuit board, and each of the electrical conductive elements is provided with four metal contacts that are electrically connected to the corresponding circular conductive rails. The metal contact on the electrical conductive element is in conductive communication with the circular conducting rail through continuous contact, so that the first wire and the second wire are connected, the situation that the first wire and the second wire are easy to break due to direct connection is prevented, and the durability and the stability of the unidirectional free-pulling data cable are improved. In addition, when the follow-up circuit board rotates along with the stretching of the first wire, the rotation track of the electrical conductive element is circular, and the conductive rail is accordingly arranged to be circular, so that the rotation track thereof is matched with that of the metal contacts on the electrical conductive element, which ensures good conductive communication between the metal contacts and the circular conductive rail. Moreover, at least two electrical conductive elements are arranged on the follow-up circuit board, so that the stability of the follow-up circuit board during rotation can be ensured, and the electrical connection between the follow-up circuit board and the fixed conductive board can be improved. When one of the electrical conductive elements is damaged and cannot work normally, the other electrical conductive elements can still ensure the electrical connection between the follow-up circuit board and the fixed conductive board, which has great practicability.

In the unidirectional free-pulling data cable of the embodiment of the present disclosure, when extending the wire from the housing, the user pulls one end of the first wire to drive the wheel cover to rotate, the protrusion on the connecting element disengages from the wheel slot and makes the connecting element deviate from the original position, and the elastic element provides a restoring force to the connecting element; when the user releases his/her hand, the elastic member inside the wheel core returns to the original state to drive the wheel core to rotate and retract the stretched first wire; however, at this time, the elastic element drives the connecting element to return, the second protrusion on the connecting element engages with the second slot of the gear, the connecting element is fixed, the protrusion of the connecting element swings through a certain angle, and the protrusion stops in the wheel slot of the wheel cover, so that the wheel cover stops rotating, which finally makes the wheel core stop rotating and plays a role in positioning.

When retracting the wire into the housing, the user pulls one end of the first wire again to drive the wheel cover to rotate again, and the protrusion on the connecting element disengages from the wheel slot again to make the connecting element deviate from the original position again, at the same time, the elastic element gives a restoring force to the connecting element; when the user releases his/her hand, the elastic member inside the wheel core returns to the original state, and the elastic element drives the connecting element to return, the first protrusion on the connecting element engages with the first slot of the gear, and the connecting element is fixed; however, since the depth of the first slot is greater than the depth of the second slot, when the connecting element is fixed, the angle that the protrusion on the connecting element swings is greater than the angle that the protrusion swings when extending the wire from the housing, and the protrusion stops outside the wheel slot of the wheel cover, the wheel cover cannot be prevented from rotating; finally, under the function of the elastic member, the stretched first wire is completely retracted, which is simple, convenient and high in efficiency.

NUMERICAL REFERENCE IDENTIFICATION 1. unidirectional free-pulling data cable;
11. first wire; 12. second wire; 13. wheel core; 14. clamping assembly; 15. housing; 16. follow-up circuit board; 17. fixed conductive board;
111. output port; 112. blocking member; 121. input port; 131. elastic member; 132. wheel cover; 141. elastic element; 142. connecting element; 143. gear; 151. upper housing; 152. lower housing; 153. fixing pillar; 154. first through-hole; 155. second through-hole; 156. fixing member; 161. electrical conductive element; 171. circular conductive rail;
1321. wheel slot; 1421. protrusion; 1422. protruding pillar; 1423. first protrusion; 1424. second protrusion; 1431. first slot; 1432. second slot; 1611. metal contact.

DETAILED DESCRIPTION

In order to make the objectives, technical solutions, and advantages of the present disclosure clearer, the present disclosure is further described in detail below with reference to the accompanying drawings and embodiments. It should be understood that the specific embodiments described herein are provided for illustration only, and not for the purpose of limiting the disclosure.

It should be noted that the terms "first" and "second" in the specification and claims of the present disclosure are used to distinguish different objects, rather than to describe a specific order.

It should be noted that, when an element is referred to as being "fixed to" another element, it can be directly on the other element or intervening elements may also exist. When an element is referred to as being "connected" to another element, it can be directly connected to the other element or intervening elements may also exist. The terms "vertical", "horizontal", "left", "right" and similar expressions are used herein for illustrative purposes only.

It should be noted that, in the present disclosure, the terms "up", "down", "left", "right", "front", "rear", "top", "bottom", "inside", "outside", "middle", "vertical", "horizontal", "longitudinal", etc. are based on the orientations or positional relationships shown in the drawings. Terms herein are primarily used to better describe the disclosure and the embodiments, and are not intended to limit that the indicated device, element, or component must have a particular orientation, or be constructed and operated in a particular orientation.

In addition, some of the above-mentioned terms may be used to express other meanings besides orientation or positional relationship. For example, the term "on" may also be used to express a certain attachment or connection relationship in some cases. For those skilled in the art, the specific meanings of the above terms in the present disclosure can be understood according to specific situations.

Furthermore, the terms "install", "arrange", "provide", "connect", "contact" should be construed broadly. For example, it may be a fixed connection, a detachable connection, or an integral structure; it may be a mechanical connection, or an electrical connection; it may be directly connected, or indirectly connected through an intermediary, or an internal communication between two devices, elements, or components. For those skilled in the art, the specific meanings of the above terms in the present disclosure can be understood according to specific situations.

Figure 1:
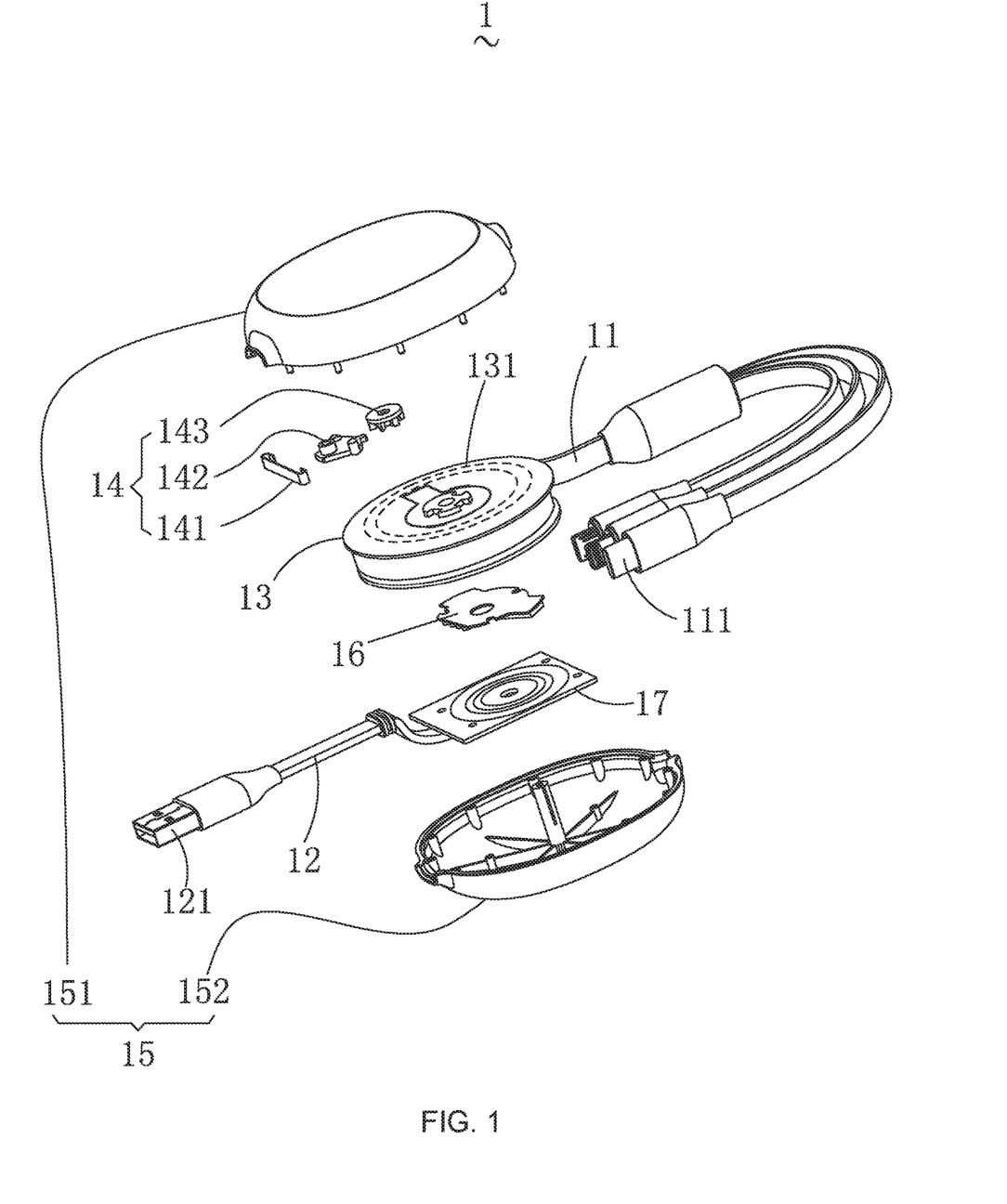
FIG. 1 is an exploded view of a unidirectional free-pulling data cable according to a first embodiment of the present disclosure.

Referring to FIG. 1, a first embodiment of the present disclosure provides a unidirectional free-pulling data cable 1 for data transmission and/or charging of an external device. The unidirectional free-pulling data cable 1 includes a first wire 11, a second wire 12, a wheel core 13, a clamping assembly 14, and a hollow housing 15. The wheel core 13 and the clamping assembly 14 are arranged in the housing 15, and the wheel core 13 is rotatable relative to the housing. The first wire 11 is wound around the wheel core 13 and exposed out of the housing 15. One end of the second wire 12 is fixed inside the housing 15, and the other end thereof is exposed out of the housing 15. An elastic member 131, which provides the wheel core 13 with a restoring force for rotation, is disposed inside the wheel core 13. The clamping assembly 14 is used for positioning the wheel core 13 to prevent the wheel core 13 from rotating.

Specifically, the housing 15 can be formed by an upper housing 151 and a lower housing 152, which are detachably connected. The wheel core 13 and the clamping assembly 14 are respectively arranged in the lower housing 152 and the upper housing 151.

It should be noted that it is not a must to divide the housing 15 into two upper and lower housings with accommodating spaces as the upper housing 151 and the lower housing 152 described above. The housing 15 may be a housing with an accommodating space and a cover, in which case the position of the clamping assembly 14 in the cover indicates the connection state therebetween.

The splicing manner of the upper housing 151 and the lower housing 152, which may be clamping, bonding, or magnetic connection, is not particularly limited herein. Preferably, in the embodiment of the present disclosure, the upper housing 151 and the lower housing 152 are spliced by clamping.

Referring to FIG. 1 again, the unidirectional free-pulling data cable 1 further includes a follow-up circuit board 16 and a fixed conductive board 17, which are also accommodated in the housing 15. The follow-up circuit board 16 is positioned on one side of the wheel core 13 and rotates along with the wheel core 13. The fixed conductive board 17 is disposed on one side of the housing 15 corresponding to the follow-up circuit board 16 and electrically connected to the follow-up circuit board 16. The first wire 11, which is electrically connected to the follow-up circuit board 16, is wound around the wheel core 13 and exposed out of the housing 15. One end of the second wire 12 is electrically connected to the fixed conductive board 17, and the other end thereof is exposed out of the housing 15. One of the first wire 11 and the second wire 12 is the input end, and the other one is the output end, which is not limited in the present disclosure.

In the unidirectional free-pulling data cable 1 of the embodiment of the present disclosure, the first wire 11, which is electrically connected with the follow-up circuit board 16 positioned at one side of the wheel core 13, is wound around the wheel core 13 and exposed out of the housing 15, and the second wire 12 is positioned on and electrically connected with the fixed conductive board 17. In this case, the input end and the output end of the unidirectional free-pulling data cable 1 are independent of each other, namely, a user only needs to stretch the wire at the input end or the output end when using, which solves the problem that the input end and the output end of the existing telescopic data cable are required to be stretched simultaneously when using, and is more convenient for use. In addition, the fixed conductive board 17 in the housing 15 is electrically connected to the follow-up circuit board 16 that rotates with the wheel core 13, which ensures an electric connection between the input end and the output end while only stretching the input end or the output end.

Specifically, the connection manner of the second wire 12 and the fixed conductive board 17 may be welding or flat cable connection, which is not specifically limited in the embodiment of the present disclosure.

Specifically, the position where the second wire 12 is connected to the fixed conductive board 17 is defined at the side of the fixed conductive board 17 close to the housing 15, which allows the second wire 12 to be drawn out from between the fixed conductive board 17 and the housing 15, so that the rotation of the follow-up circuit board 16 is not affected.

For the convenience of understanding, the embodiment of the present disclosure is described by taking the first wire 11 as the output end and the second wire 12 as the input end, which should not be construed as a limitation. In some embodiments, the first wire 11 may be the input end and the second wire 12 may be the output end.

Referring to FIG. 1 again, further, an input port 121, which is used for connecting a plug or a charging port to connect power or transmit data, is disposed at one end of the second wire 12 exposed out of the housing 15. An output port 111, which is used for charging an external device or transmitting data, is disposed at one end of the first wire 11 exposed out of the housing 15. Specifically, the input port 121 may be one of a USB interface and a Type-C interface; the output port 111 may be one or more combinations of a micro USB interface, a Type-C interface and a Lightning interface. When there is a combination of multiple interfaces in particular, the unidirectional free-pulling data cable 1 can charge multiple external devices simultaneously, which greatly improves the practicability thereof.

Figure 2:
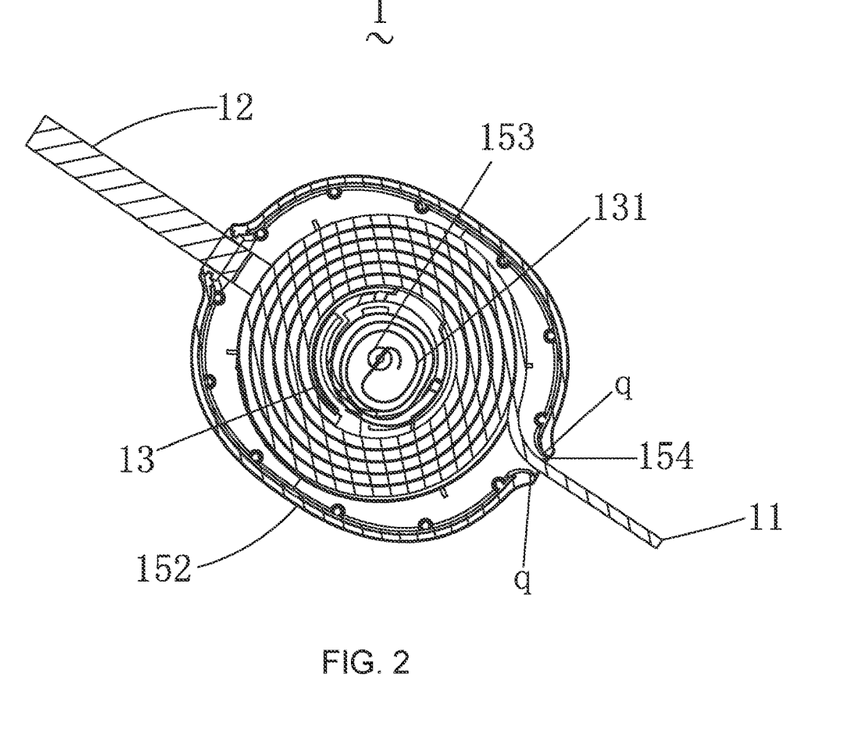
FIG. 2 is a first section view of the unidirectional free-pulling data cable according to the first embodiment of the present disclosure.

Referring to FIG. 2, specifically, a fixing pillar 153 is disposed in the lower housing 152. The elastic member 131 is a spiral spring, and two ends thereof are respectively positioned on the fixing pillar 153 and the wheel core 13.

When rotating, the spring can provide a restoring force to the wheel core 13 so that the core 13 has a tendency of returning. Of course, the elastic member 131 may also be an element with elastic function, such as an elastic block or the like, as long as a restoring force can be provided to make the wheel core 13 have a tendency of returning when rotating.

Figure 3:
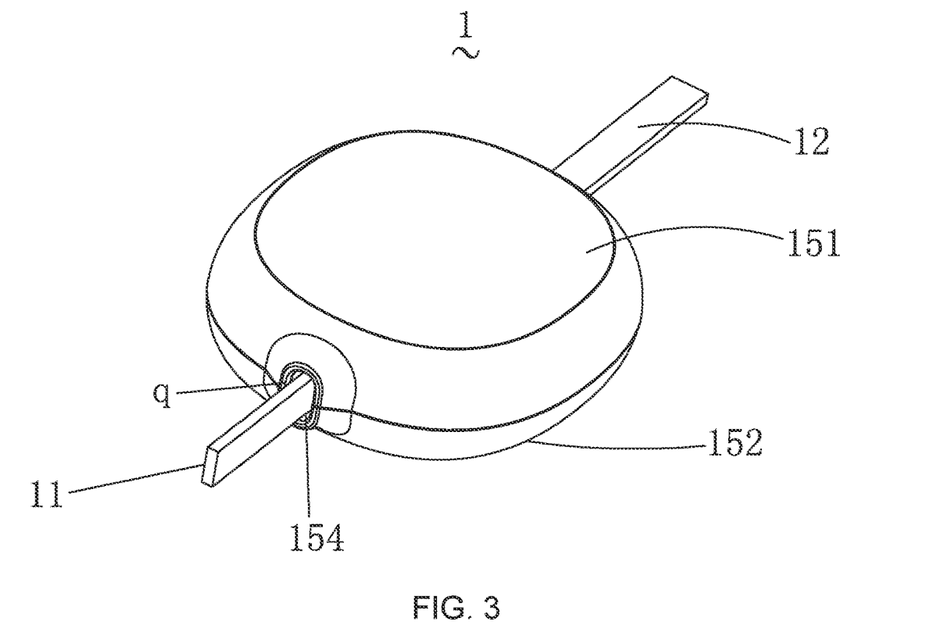
FIG. 3 is a perspective view of the unidirectional free-pulling data cable according to the first embodiment of the present disclosure.

Referring to FIG. 2 and FIG. 3, a first through-hole 154, which allows the first wire 11 to be exposed out of the housing 15, is defined on the housing 15. Specifically, there is a gap between the first through-hole 154 and the first wire 11, which facilitates the stretching and retracting of the first wire 11.

Further, the edge of the first through-hole 154 along the thickness direction of the housing 15 is a smooth-curved surface q (as shown in FIG. 2), namely, the side edge of the first through-hole 154 is a smooth-curved surface q. Thus, the first wire 11, when in contact with the edge of the first through-hole 154, can be prevented from being scratched by the edge of the first through-hole 154. The scratch can be prevented to the greatest extent especially when stretching one end of the first wire 11 due to the force acting on the first wire 11 and the edge of the first through-hole 154 being large. In addition, the smooth-curved surface q can play a guiding role, which enables another end of the first wire 11 to be more smoothly away from the housing 15 when a user stretches one end of the first wire 11.

Figure 4:
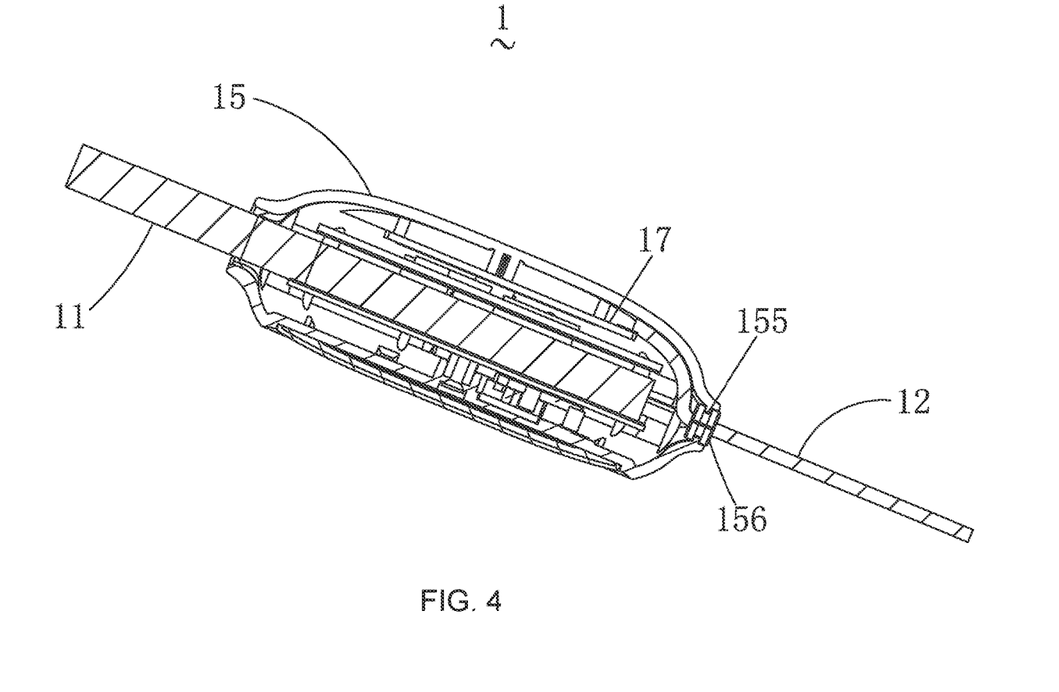
FIG. 4 is a second section view of the unidirectional free-pulling data cable according to the first embodiment of the present disclosure.
Figure 5:
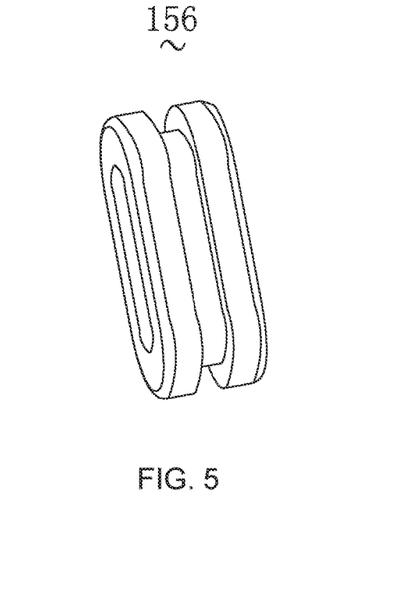
FIG. 5 is a perspective view of a fixing member of the unidirectional free-pulling data cable according to the first embodiment of the present disclosure.

Referring to FIG. 4 and FIG. 5, a second through-hole 155, which is used for exposing the second wire 12 out of the housing 15, is defined on the housing 15. Further, a fixing member 156 is provided at the second through-hole 155, and the second wire 12 is exposed out of the housing 15 through the fixing member 156 to prevent the second wire 12 from moving away from the housing 15. By disposing the fixing member 156, the second wire 12 can be prevented from stretching in the direction away from housing 15, namely, the end of the second wire 12 that is electrically connected to the fixed conductive board 17 is relatively fixed to the fixed conductive board 17 to prevent poor contact between the second wire 12 and the fixed conductive board 17 due to dragging the second wire 12, which ensures the normal use of the unidirectional free-pulling data cable 1.

Specifically, the fixing member 156 is made of an elastic material, which can prevent the second wire 12 from being worn at the second through-hole 155 due to the second wire 12 being dragged during long-term use.

Specifically, the fixing member 156, which is integrally in an I shape, has a structure of wide in two ends and narrow in the middle. The narrow middle portion is clamped at the second through-hole 155, and the wide ends portion enable the fixing member 156 to be firmly fixed at the second through-hole 155.

Figure 6:
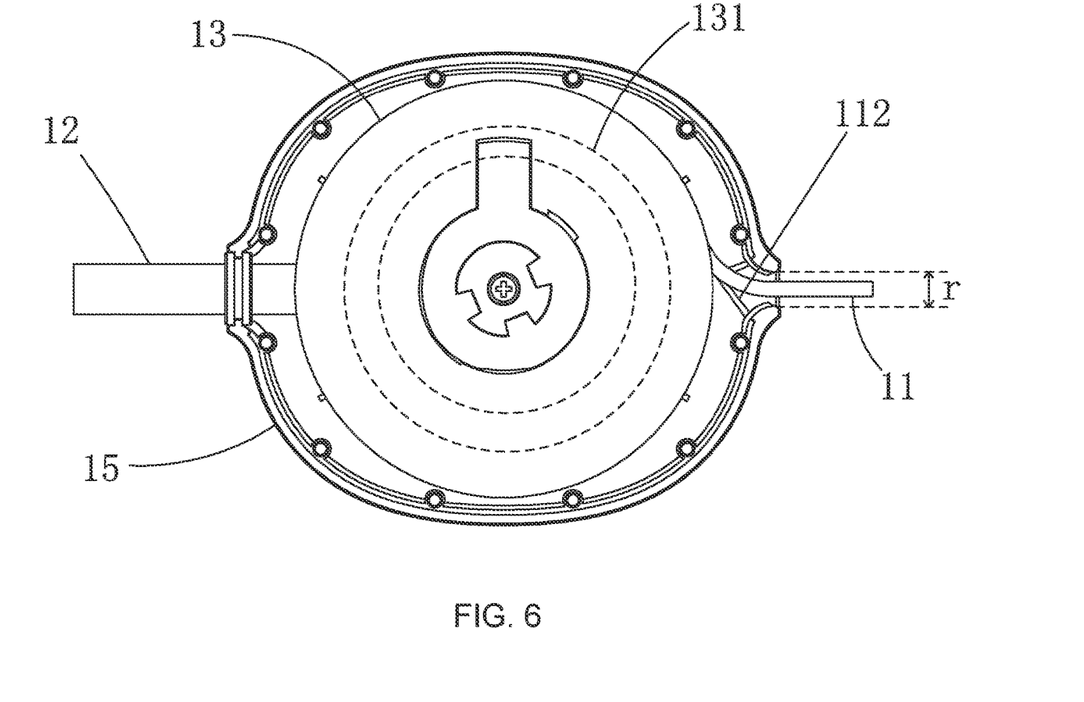
FIG. 6 is a partial view of the unidirectional free-pulling data cable according to the first embodiment of the present disclosure.

Referring to FIG. 6, a blocking member 112, which is used for limiting the distance that the first wire 11 is pulled out in a direction away from the housing 15, is provided at the position close to the end of the first wire 11 connected to the wheel core 13. By disposing the blocking member 112, the distance that the first wire 11 is extended out of the housing 15 can be limited, which prevents the elastic member 131 in the wheel core 13 from being damaged due to overstretching and ensures the normal use of the unidirectional free-pulling data cable 1.

Specifically, the position of the blocking member 112 disposed on the first wire 11 matches the position of the first wire 11 corresponding to the first through-hole 154 when the elastic member 131 is at the elastic limit. It can be understood that the elastic limit refers to the limit value at which the deformation of an object can disappear completely and return to its original state when the internal interaction force against the external force does not exceed a certain limit value when the external force is applied. By limiting the position of the blocking member 112, the elastic member 131 can be maintained within the elastic limit range, which prevents the situation that the elastic member 131 exceeds the elastic limit and cannot return to its original state when stretching the first wire 11, causing that the first wire 11 cannot be retracted, and the lifetime of the elastic member 131 is further prolonged.

Of course, in some embodiments, the position of the blocking member 112 disposed on the first wire 11 may match the position of the first wire 11 corresponding to the first through-hole 154 when the elastic member 131 does not reach the elastic limit, as long as the situation that the elastic member 131 exceeds the elastic limit and cannot return to the original state when stretching the first wire 11 is prevented, which is not limited herein.

Figure 7:
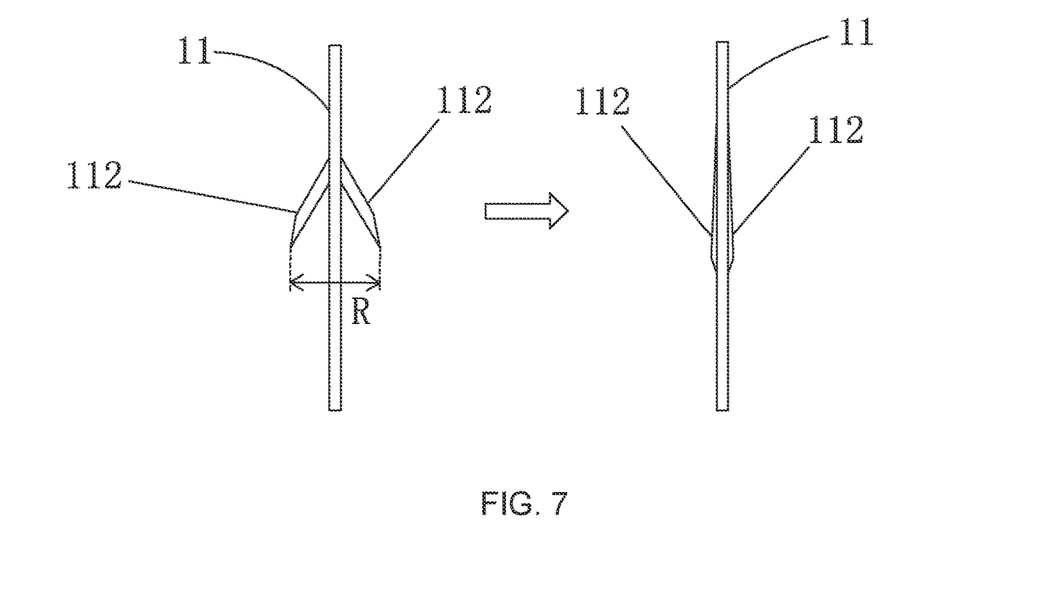
FIG. 7 is a schematic diagram of two states of the blocking member of the unidirectional free-pulling data cable according to the first embodiment of the present disclosure.

Referring to FIG. 6 and FIG. 7, the blocking member 112 includes at least one blocking piece. One end of the blocking piece is fixed on the first wire 11, the other end thereof is a free end and is disposed obliquely to the first wire 11. When the first wire 11 is pulled out from the housing, the blocking piece moves following the first wire 11 to the first through-hole 154 and the free end of the blocking piece abuts against the inner wall of the housing 15 so that the stretching distance of the first wire 11 in the direction away from the housing 15 can be limited. Thus, the free end is in close contact with the first wire 11 when retracting, and in a naturally open state when stretching, which does not affect the first wire 11 being wound on the wheel core 13 when retracting, and the first wire 11 can also be limited when stretching to a certain extent in the direction away from the housing 15, which has great practicability.

Specifically, the blocking member 112 includes two blocking pieces arranged in a splayed shape, and the distance R (shown as R in FIG. 7) between the free ends of the two blocking pieces in a natural state is larger than the aperture R (shown as R in FIG. 6) of the first through-hole 154. Thus, the free ends of the two blocking pieces are respectively opened to both sides of the first wire 11 while stretching, so that the stretching of the first wire 11 in the direction away from the housing 15 can be further limited. The free ends thereof are in close contact with the first wire 11 while retracting to ensure the normal retraction of the first wire 11.

Specifically, the blocking piece may be an elastic piece, preferably a metal elastic piece, which is not specifically limited herein, as long as the first wire 11 can be limited when stretching to a certain extent in a direction away from the housing 15, and the retraction of the first wire 11 is not affected when retracting.

Figure 8:
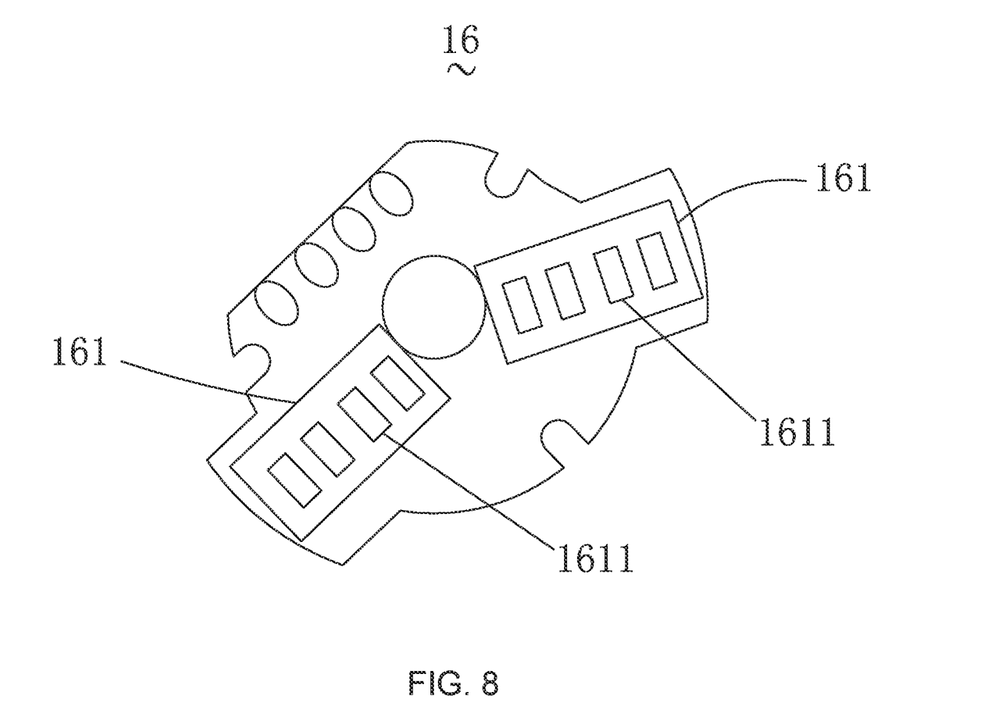
FIG. 8 is a perspective view of a follow-up circuit board of the unidirectional free-pulling data cable according to the first embodiment of the present disclosure.
Figure 9:
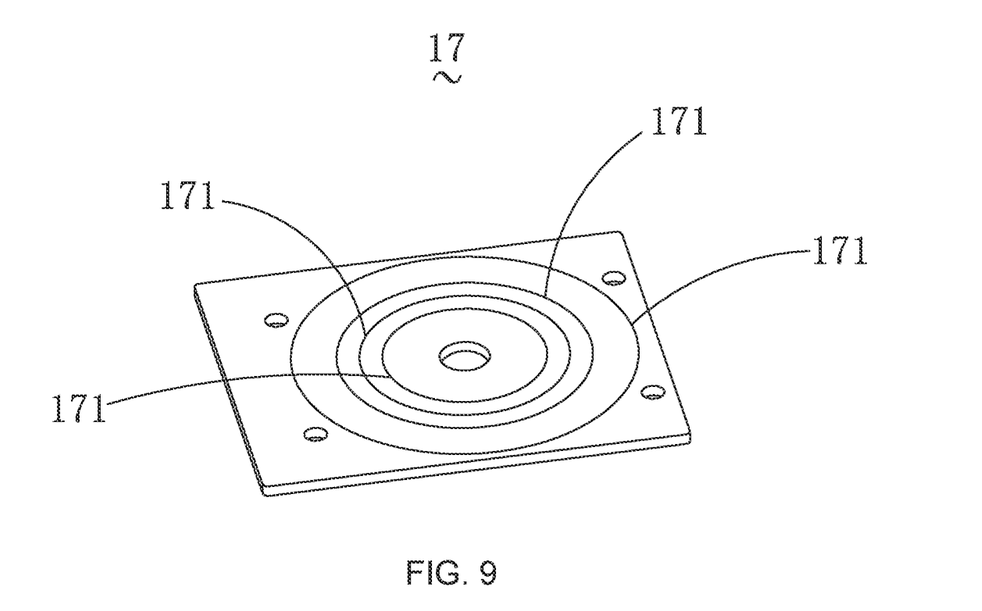
FIG. 9 is a perspective view of a fixed conductive board of the unidirectional free-pulling data cable according to the first embodiment of the present disclosure.

Referring to FIG. 8 and FIG. 9, specifically, four circular conductive rails 171, which are concentric circles with different diameters, are arranged at positions of the fixed conductive board 17 corresponding to the follow-up circuit board 16. At least two electrical conductive elements 161 are arranged on the follow-up circuit board 16, and each of the electrical conductive elements 161 is provided with four metal contacts 1611 that are electrically connected to the corresponding circular conductive rails 171.

The metal contact 1611 on the electrical conductive element 161 is in conductive communication with the circular conducting rail 171 through continuous contact, so that the first wire 11 and the second wire 12 are connected, the situation that the first wire 11 and the second wire 12 are easy to break due to direct connection is prevented, and the durability and the stability of the unidirectional free-pulling data cable 1 are improved. In addition, when the follow-up circuit board 16 rotates along with the stretching of the first wire 11, the rotation track of the electrical conductive element 161 is circular, and the conductive rail is accordingly arranged to be circular, so that the rotation track thereof is matched with that of the metal contacts 1611 on the electrical conductive element 161, which ensures good conductive communication between the metal contacts 1611 and the circular conductive rail 171. Preferably, at least two electrical conductive elements 161 are arranged on the follow-up circuit board 16, so that the stability of the follow-up circuit board 16 during rotation can be ensured, and the electrical connection between the follow-up circuit board 16 and the fixed conductive board 17 can be improved. When one of the electrical conductive elements 161 is damaged and cannot work normally, the other electrical conductive elements 161 can still ensure the electrical connection between the follow-up circuit board 16 and the fixed conductive board 17, which has great practicability.

Specifically, the metal contact 1611 may be a metal contact pin or a metal elastic piece, which is not limited in the embodiments of the present disclosure.

Figure 10:
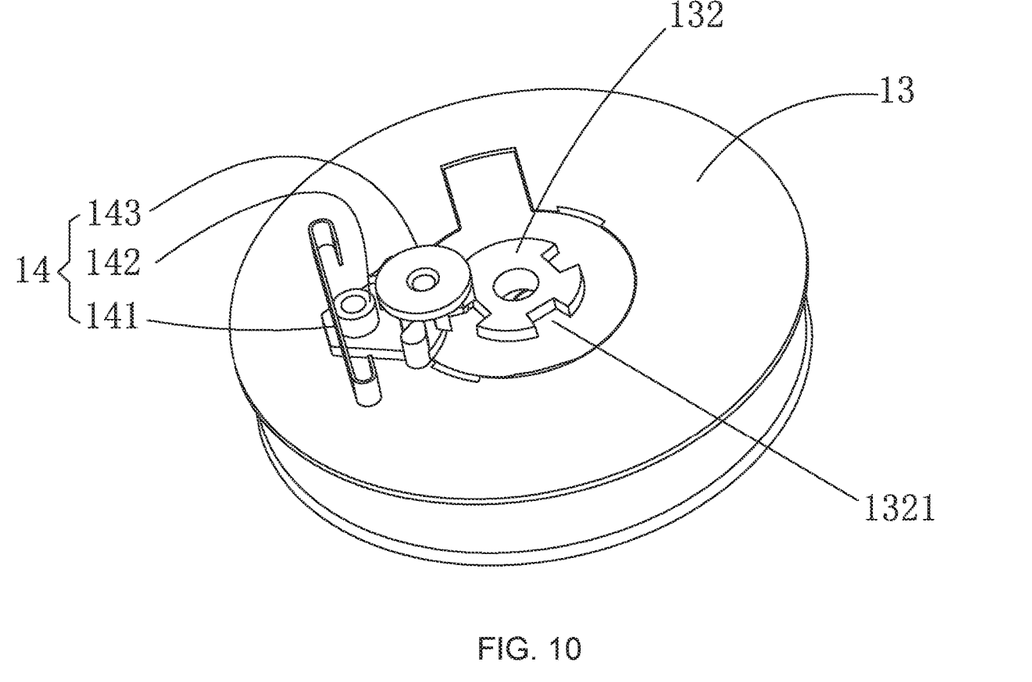
FIG. 10 is a schematic diagram of cooperation between a clamping assembly and a wheel core of the unidirectional free-pulling data cable according to the first embodiment of the present disclosure.
Figure 11:
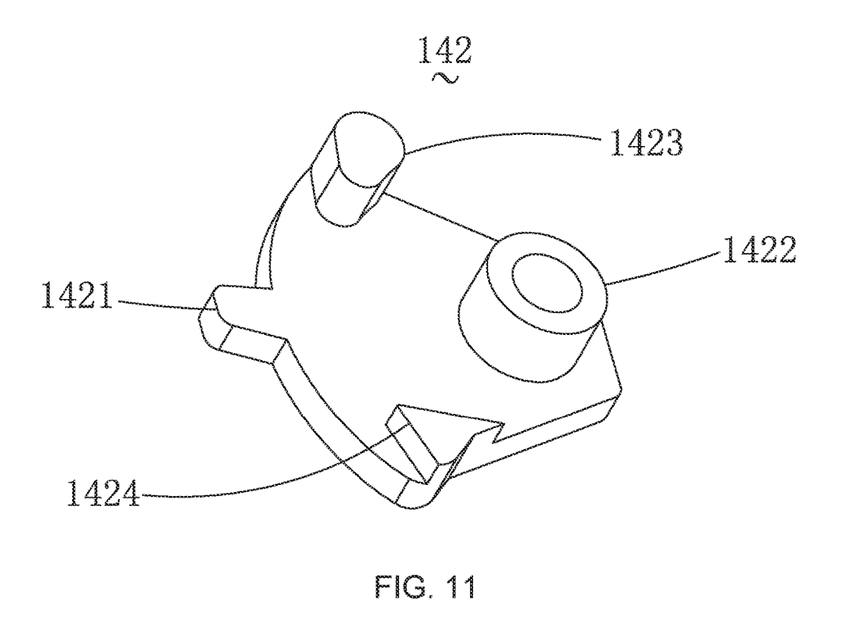
FIG. 11 is a perspective view of a connecting element of the unidirectional free-pulling data cable according to the first embodiment of the present disclosure.
Figure 12:
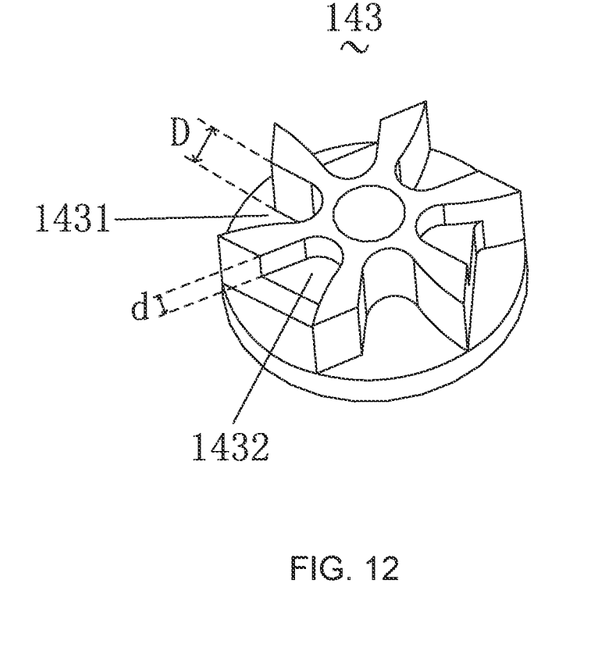
FIG. 12 is a perspective view of a gear of the unidirectional free-pulling data cable according to the first embodiment of the present disclosure.

Referring to FIGS. 10 to 12, specifically, a wheel cover 132 is disposed on one side of the wheel core 13, and the clamping assembly 14 is disposed on one side of the housing 15 corresponding to the wheel cover 132 and cooperates with the wheel cover 132 to position the wheel core 13 to limit the rotation of the wheel core 13.

More specifically, the clamping assembly 14 includes an elastic element 141, a connecting element 142 and a gear 143. A wheel slot 1321 is defined on the wheel cover 132. One end of the connecting element 142 is provided with a protrusion 1421 matching with the wheel slot 1321, and the other end thereof abuts against the elastic element 141 through a protruding pillar 1422. One side of the connecting element 142 close to the gear 143 is further provided with a first protrusion 1423 and a second protrusion 1424, and the gear 143 is disposed between the first protrusion 1423 and the second protrusion 1424. The adjacent two slots of the gear 143, which are respectively defined as a first slot 1431 and a second slot 1432, have different depths. The first slot 1431 and the second slot 1432 are respectively engaged with the first protrusion 1423 and the second protrusion 1424. For the convenience of understanding, the depth (shown as D in FIG. 12) of the first slot 1431 is greater than the depth (shown as d in FIG. 12) of the second slot 1432 in the embodiment, which should not be construed as a limitation of the present disclosure.

The numbers of the wheel slot 1321, the first slot 1431 and the second slot 1432 in the embodiments of the present disclosure are not particularly limited. Specifically, in the embodiments of the present disclosure, the numbers of the wheel slot 1321, the first slot 1431 and the second slot 1432 are respectively 3, which can realize 3 different lengths when stretching the wire, thereby satisfying different requirements of the wire length.

Optionally, the elastic element 141 may be a spring or a spring piece. Specifically, in the embodiment of the present disclosure, the elastic element 141 is a spring piece with two ends fixed on the housing 15. The middle portion thereof has an elastic function, and one end of the connecting element 142 away from the protrusion 1421 abuts against the middle portion thereof through a protruding pillar 1422.

In summary, when extending the wire from the housing, the user pulls one end of the first wire 11 to drive the wheel cover 132 to rotate, the protrusion 1421 on the connecting element 142 disengages from the wheel slot 1321 and makes the connecting element 142 deviate from the original position, and the elastic element 141 provides a restoring force to the connecting element 142; when the user releases his/her hand, the elastic member 131 inside the wheel core 13 returns to the original state to drive the wheel core 13 to rotate and retract the stretched first wire 11; however, at this time, the elastic element 141 drives the connecting element 142 to return, the second protrusion 1424 on the connecting element 142 engages with the second slot 1432 of the gear 143, the connecting element 142 is fixed, the protrusion 1421 of the connecting element 142 swings through a certain angle, and the protrusion 1421 stops in the wheel slot 1321 of the wheel cover 132, so that the wheel cover 132 stops rotating, which finally makes the wheel core 13 stop rotating and plays a role in positioning.

When retracting the wire into the housing, the user pulls one end of the first wire 11 again to drive the wheel cover 132 to rotate again, and the protrusion 1421 on the connecting element 142 disengages from the wheel slot 1321 again to make the connecting element 142 deviate from the original position again, at the same time, the elastic element 141 gives a restoring force to the connecting element 142; when the user releases his/her hand, the elastic member 131 inside the wheel core 13 returns to the original state, and the elastic element 141 drives the connecting element 142 to return, the first protrusion 1423 on the connecting element 142 engages with the first slot 1431 of the gear 143, and the connecting element 142 is fixed; however, since the depth of the first slot 1431 is greater than the depth of the second slot 1432, when the connecting element 142 is fixed, the angle that the protrusion 1421 on the connecting element 142 swings is greater than the angle that the protrusion 1421 swings when extending the wire from the housing, and the protrusion 1421 stops outside the wheel slot 1321 of the wheel cover 132, the wheel cover 132 cannot be prevented from rotating; finally, under the function of the elastic member 131, the stretched first wire 11 is completely retracted, which is simple, convenient and high in efficiency.

The foregoing descriptions are only preferred embodiments of the present disclosure, and should not be construed as limiting the scope of the disclosure. Any modifications, equivalent replacements and improvements made within the principles of the present disclosure should be included within the protection scope of the present disclosure.

The invention claimed is:

1. A unidirectional free-pulling data cable, comprising a first wire, a second wire, a wheel core, a follow-up circuit board, a fixed conductive board, a clamping assembly and a hollow housing; the wheel core and the clamping assembly being arranged in the housing; the wheel core being rotatable relative to the housing, the follow-up circuit board being positioned on one side of the wheel core; the fixed conductive board being disposed on one side of the housing corresponding to the follow-up circuit board and electrically connected to the follow-up circuit board;

the first wire that is electrically connected to the follow-up circuit board being wound around the wheel core and exposed out of the housing; one end of the second wire being electrically connected to the fixed conductive board, and the other end thereof being exposed out of the housing;

an elastic member being disposed inside the wheel core, and the opposite side of the wheel core being provided with a wheel cover; the clamping assembly disposed on one side of the housing corresponding to the wheel cover cooperating with the wheel cover to position the wheel core to limit the rotation of the wheel core;

the housing comprising an upper housing and a lower housing that are detachably connected; the wheel core being disposed in the lower housing, and the clamping assembly being disposed in the upper housing, a fixing pillar being disposed in the lower housing, one end of the elastic member being positioned on the fixing pillar, and the other end thereof being positioned on the wheel core, and wherein when the wheel core rotates, the elastic member providing the wheel core with a restoring force for rotating back.

2. The unidirectional free-pulling data cable according to claim 1, wherein a first through-hole and a second through-hole are defined on the housing, which respectively allow the first wire and the second wire to be exposed out of the housing.

3. The unidirectional free-pulling data cable according to claim 2, wherein a fixing member is provided at the second through-hole, and the second wire being exposed out of the housing through the fixing member to prevent the second wire from moving away from the housing.

4. The unidirectional free-pulling data cable according to claim 2, wherein the edge of the first through-hole along the thickness direction of the housing is a smooth-curved surface.

5. The unidirectional free-pulling data cable according to claim 2, wherein a blocking member for limiting the distance that the first wire is pulled out in a direction away from the housing is provided at the position close to the end of the first wire connected to the wheel core.

6. The unidirectional free-pulling data cable according to claim 5, wherein the position of the blocking member on the first wire matches the position of the first wire corresponding to the first through-hole when the elastic member is smaller than or equal to the elastic limit.

7. The unidirectional free-pulling data cable according to claim 5, wherein the blocking member comprises at least one blocking piece, one end of the blocking piece being fixed on the first wire, the other end thereof being a free end and disposed obliquely to the first wire;

when the first wire being pulled out from the housing, the blocking piece moves following the first wire to the first through-hole and the free end of the blocking piece abutting against the inner wall of the housing, so that the stretching distance of the first wire in the direction away from the housing can be limited.

8. The unidirectional free-pulling data cable according to claim 7, wherein the blocking member comprises two blocking pieces arranged in a splayed shape, and the distance between the free ends of the two blocking pieces in a natural state being larger than the aperture of the first through-hole.

9. The unidirectional free-pulling data cable according to claim 1, wherein four circular conductive rails that are concentric circles with different diameters are arranged at positions of the fixed conductive board corresponding to the follow-up circuit board;

at least two electrical conductive elements being arranged on the follow-up circuit board, and each of the electrical conductive elements being provided with four metal contacts that are electrically connected to the corresponding circular conductive rails.

10. The unidirectional free-pulling data cable according to claim 1, wherein the clamping assembly comprises an elastic element, a connecting element and a gear, a wheel slot being defined on the wheel cover;

one end of the connecting element being provided with a protrusion matching with the wheel slot, and the other end thereof abutting against the elastic element; one side of the connecting element close to the gear being further provided with a first protrusion and a second protrusion, and the gear being disposed between the first protrusion and the second protrusion.

11. The unidirectional free-pulling data cable according to claim 10, wherein the adjacent two slots of the gear that are respectively defined as a first slot and a second slot having different depths; the first slot and the second slot being respectively engaged with the first protrusion and the second protrusion.

12. The unidirectional free-pulling data cable according to claim 1, wherein the detachable connection may be clamping, bonding, or magnetic connection.

13. The unidirectional free-pulling data cable according to claim 1, wherein one of the first wire and the second wire is the input end, and the other one being the output end.

14. The unidirectional free-pulling data cable according to claim 13, wherein the ends of the first wire and the second wire exposed out of the housing are provided with ports, one end thereof being provided with an input port for connecting to a plug or a charging port to connect power or transmit data, and the other end thereof being provided with an output port for charging an external device or transmitting data.

15. The unidirectional free-pulling data cable according to claim 14, wherein the input port may be one of a USB interface and a Type-C interface; the output port may be one or more combinations of a micro USB interface, a Type-C interface and a Lightning interface.

16. The unidirectional free-pulling data cable according to claim 3, wherein the fixing member generally has a structure of wide in two ends and narrow in the middle; the narrow middle portion being clamped at the second through-hole, and the wide ends portion enabling the fixing member to be firmly fixed at the second through-hole.

17. The unidirectional free-pulling data cable according to claim 10, wherein the elastic element is a spring piece with two ends fixed on the housing; the middle portion thereof having an elastic function, and one end of the connecting element away from the protrusion abutting against the middle portion thereof through a protruding pillar.

18. A unidirectional free-pulling data cable, comprising two wires, a housing, a wheel core assembly, a circuit board assembly and a clamping assembly; the wheel core assembly and the circuit board assembly being accommodated in the housing; the wheel core assembly being rotatably relative to the housing; the circuit board assembly comprising a follow-up circuit board positioned on one side of the wheel core assembly and a fixed conductive board fixed to the housing and electrically connected to the follow-up circuit board;

one of the two wires electrically connected to the follow-up circuit board being wound around the wheel core assembly and exposed out of the housing; the other wire being electrically connected to the fixed conductive board and exposed out of the housing;

an elastic member being disposed in the wheel core assembly;

the housing comprising an upper housing and a lower housing that are detachably connected; the wheel core assembly being disposed in the lower housing, and the clamping assembly being disposed in the upper housing;

a fixing pillar is disposed in the lower housing, one end of the elastic member being positioned on the fixing pillar, and the other end thereof being positioned on the wheel core assembly; and wherein when the wheel core assembly rotates, the elastic member providing the wheel core assembly with a restoring force for rotating back.

* * * * *